(12) United States Patent
Boening et al.

(10) Patent No.: US 8,764,389 B2
(45) Date of Patent: Jul. 1, 2014

(54) TURBOCHARGER HAVING FASTENING ELEMENTS FOR FASTENING VANE BEARING RINGS OF A VARIABLE TURBINE GEOMETRY VTG

(75) Inventors: Ralf Boening, Reiffelbach (DE); Dirk Frankenstein, Floersheim-Dalsheim (DE); Holger Faeth, Fussgoenheim (DE)

(73) Assignee: Continental Automotive GmbH, Hannover (DE)

( * ) Notice: Subject to any disclaimer, the term of this patent is extended or adjusted under 35 U.S.C. 154(b) by 568 days.

(21) Appl. No.: 13/123,561

(22) PCT Filed: Sep. 24, 2009

(86) PCT No.: PCT/EP2009/062358
§ 371 (c)(1),
(2), (4) Date: Apr. 11, 2011

(87) PCT Pub. No.: WO2010/040643
PCT Pub. Date: Apr. 15, 2010

(65) Prior Publication Data
US 2011/0286838 A1 Nov. 24, 2011

(30) Foreign Application Priority Data
Oct. 9, 2008 (DE) .......................... 10 2008 051 041

(51) Int. Cl.
*F01D 9/02* (2006.01)
(52) U.S. Cl.
USPC ...... 415/164; 415/165; 415/209.4; 415/211.1

(58) Field of Classification Search
USPC ............ 415/164, 165, 209.4, 211.1; 411/452, 411/454
See application file for complete search history.

(56) References Cited

U.S. PATENT DOCUMENTS

| 3,972,644 A | 8/1976 | Johnson |
| 4,804,316 A * | 2/1989 | Fleury ........................... 417/407 |
| 4,907,952 A * | 3/1990 | Inoue et al. .................... 417/407 |
| 6,050,775 A | 4/2000 | Erdmann et al. |
| 6,401,563 B1 | 6/2002 | Franklin |
| 7,214,021 B2 * | 5/2007 | Caponi ......................... 411/454 |
| 7,303,370 B2 | 12/2007 | Metz et al. |
| 7,670,107 B2 * | 3/2010 | Barthelet et al. .............. 415/160 |
| 8,333,556 B2 * | 12/2012 | Hettinger et al. ............. 415/165 |
| 2004/0076513 A1 | 4/2004 | Sishtla et al. |
| 2011/0014033 A1 | 1/2011 | Böning et al. |

FOREIGN PATENT DOCUMENTS

| AT | 504 446 A2 | 5/2008 |
| DE | 197 52 534 C1 | 10/1998 |
| DE | 10 2004 020 340 A1 | 11/2005 |
| DE | 10 2004 044 703 A1 | 3/2006 |
| DE | 60302542 T2 | 8/2006 |
| DE | 60307571 T2 | 12/2006 |
| DE | 102008014678 A1 | 4/2010 |
| EP | 1452742 A1 | 9/2004 |

(Continued)

*Primary Examiner* — Ninh H Nguyen
(74) *Attorney, Agent, or Firm* — Laurence A. Greenberg; Werner H. Stemer; Ralph E. Locher (57) ABSTRACT

A turbocharger with a variable turbine geometry device has one or two blade bearing rings. At least one or more fastening elements are provided for fastening the one or two blade bearing rings. The respective fastening element has at least one section formed with a knurl and/or at least one section formed with at least one or several notches.

14 Claims, 4 Drawing Sheets

(56) References Cited

FOREIGN PATENT DOCUMENTS

| EP | 1 528 225 A1 | 5/2005 |
| EP | 1 734 231 A1 | 12/2006 |
| GB | 792 122 | 3/1958 |
| WO | 98/46862 A1 | 10/1998 |
| WO | 2008/118833 A1 | 10/2008 |

* cited by examiner

FIG. 1

VTG-ATL (Variable turbine geometry-exhaust gas turbocharger) with vane bearing assembly on both sides

$d_1$: Fit diameter
$d_2$: Outside diameter

Cylindrical notched pin

TURBOCHARGER HAVING FASTENING ELEMENTS FOR FASTENING VANE BEARING RINGS OF A VARIABLE TURBINE GEOMETRY VTG

BACKGROUND OF THE INVENTION

Field of the Invention

The invention refers to a turbocharger, for a motor vehicle, for example, having fastening elements for fastening vane bearing rings of a variable turbine geometry (VTG).

In turbochargers having a variable turbine geometry VTG, movable guide vanes are generally arranged around the turbine wheel of a turbine. The guide vanes in this case can be adjusted via an adjusting ring, for example, in order to suitably alter the flow cross section of the turbine. By the turbine cross section being adjusted to the corresponding running state of the engine, a reduction of fuel consumption and emissions can be achieved. The guide vanes which are rotatably mounted between the scroll casing and the turbine wheel in this case alter the pressure build-up behavior and therefore the power output of the turbine. In this way, the total exhaust gas energy can be utilized and the flow cross-section of the turbine can be optimally adjusted for each operating point.

The variable guide vanes of such a variable turbine geometry in this are arranged between two vane bearing rings. Furthermore, provision is made for an adjusting ring, in which vane levers can engage, causing the guide vanes to pivot.

The vane bearing rings in this case are positioned in relation to each other in a vane bearing assembly on both sides so that the vane bores of both vane bearing rings align with each other so that the two vane bearing rings do not rotate or radially shift in relation to each other during operation. In this case, tilting of the guide vanes and therefore increased friction or even guide vane seizure can otherwise occur.

A guide vane apparatus of an exhaust gas turbocharger with a variable turbine geometry (VTG) supports the variable guide vanes in a vane bearing ring, for example, wherein a one-sided bearing assembly is provided, or, as previously described, supports the variable guide vanes in two vane bearing rings, wherein a two-sided bearing assembly, or bearing assembly on both sides, is provided. In the case of the one-sided bearing assembly, in this case the end face of the guide vanes runs onto a thrust ring. Furthermore, distance sleeves form the vane passage or the flow passage through the guide vane apparatus between the vane bearing rings and the thrust ring. The distance sleeve, the vane bearing ring and the thrust ring are axially connected by a screw. The radial positioning accuracy of thrust ring and vane bearing ring is determined in this case via the clearance between the screw thread and the bore in the thrust ring. An exact positioning of thrust ring and vane bearing ring is of secondary importance in this case. In the case of the bearing assembly on both sides, the vane bearing rings must be positioned very accurately in relation to each other, i.e. the bores for the vane tenons must be in exact alignment in order to avoid tilting and therefore to avoid seizing of the guide vanes. In known systems, the two vane bearing rings are connected in this case by cylindrical pins which together with the bores in the vane bearing ring constitute a fit, being a clearance fit, transition fit or press fit, for example.

Press fits with cylindrical pins certainly allow good positioning of the vane bearing rings in relation to each other. However, they require a large pressing-in force, which makes installation more difficult.

BRIEF SUMMARY OF THE INVENTION

It is therefore the object of the present invention to provide a turbocharger with a simplified fastening for a variable turbine geometry VTG.

This object is achieved by means of a turbocharger with the features of the patent claims.

Thus, according to the invention, provision is made for a turbocharger with a variable turbine geometry device which has one or two or more vane bearing ring elements,
    wherein at least one or more fastening elements is, or are, provided for fastening the one or the two or the plurality of vane bearing ring elements,
    wherein the respective fastening element has at least one section with a knurl and/or at least one section with at least one or more notches.

The turbocharger in this case has the advantage that the points of the notch mouth or of the knurl of the fastening element mesh in the associated bore of the guide vane bearing ring. As a result of the notches or the knurls, the fastening element maintains a shakeproof retention even in very smooth bores, which continues to hold good even during disassembly.

Advantageous developments and further developments of the invention are gathered from the dependent claims and also from the description with reference to the drawings.

In one embodiment according to the invention, the fastening element is a pin element, for example, being a cylindrical or essentially cylindrical pin element, for example. Such pin elements are particularly suitable for the pinning of bores or cylindrical bores, as are provided in the blade bearing rings.

In a further embodiment according to the invention, the fastening element has at least one or more sections with a knurl, being a longitudinal knurl or helical knurl, for example. The section, or sections, with the knurl is, or are, provided at least where the fastening element is to be provided essentially fixed in a bore, for example, wherein the entire section of the fastening element in each case which comes into contact with the bore does not have to be provided with a knurl. It is sufficient if one section with a knurl, or the mouth of the material of the knurl, meshes with the inner side of the bore in order to cause the fastening element to form a fixed connection with the material which is to be connected. Instead of this, a section of the bore of the corresponding blade bearing ring element together with a section of the fastening element without a knurl can also alternatively form a clearance fit, for example. Alternatively, the fastening element, in the case of a knurl over the entire length, for example, may not even extend over the entire length of the bore of the vane bearing ring in the installed state. In other words, a region of the bore of the blade bearing ring element remains free of the fastening element in the installed state. That previously described for the knurl also applies to the provision of one or more notches.

According to another embodiment according to the invention, the fastening element is a notched pin, for example, wherein the notched pin has least one, two, three or more notches which are preferably arranged in a distributed manner on the periphery. Provision can be made, for example, for a common notched pin with three longitudinal notches, wherein the notches are arranged in a manner in which they are distributed by 120°, for example, on the periphery of the notched pin. In a further embodiment according to the invention, the notched pin can be formed as a tapered notched pin, a center-grooved notched pin, a conical notched pin or a close tolerance notched pin, for example.

In a further embodiment according to the invention, the fit between the fastening element and an associated bore, for example a bore of the respective vane bearing ring element, in the region of the section with the knurl or with the notch is a press fit, and in the region of the section which has no knurl or notch is a clearance fit, for example, being a tight clearance fit, for example. Such a combination of press fit and clearance fit has the advantage that a smaller pressing-in force is required than in the case of a continuous press fit over the entire length of the bore. As a result, an easier installation of the fastening elements is possible, wherein the positioning accuracy can be improved in comparison to conventional, smooth-walled cylindrical pins.

In a further embodiment according to the invention, two vane bearing ring elements, for example, are positioned in relation to each other via one or more fastening elements in each case. Between the vane bearing rings, the guide vane element inter alia of the variable turbine geometry device can be arranged in this case.

According to another embodiment according to the invention, a center section or the two end sections of the fastening element, for example, has, or have, a knurl, for example a longitudinal knurl, or one or more notches. A fastening element with a center section with a longitudinal knurl is easily and inexpensively obtainable as a standard component.

In a further embodiment according to the invention, a center section, the two end sections, or the entire shank of the fastening element, has, or have, one or more notches. A fastening element in which the entire shank has three notches, for example, is also easily and inexpensively obtainable as a standard component.

According to another embodiment according to the invention, a section of the bore of the respective vane bearing ring element together with the region of the fastening element which has a knurl or one or more notches forms a press fit and with the region of the fastening element without a knurl or one or more notches forms a clearance fit. This has the advantage that stresses, for example, which arise during operation of the exhaust gas turbocharger, certainly act on the bore in the region of the press fit although essentially do not act, or act considerably less, in the region of the clearance fit so that the bore is essentially not deformed, or hardly deformed, there.

In a further embodiment according to the invention, the fastening element has a knurl or one or more notches over its entire length. In this case, a fastening element, the overall length of which is short enough so that in the installed state in each case it forms a fit, being a press fit, for example, only with one section of the bore of the respective vane bearing ring element, is selected for fastening of the vane bearing ring (s). The other region of the bore is not in engagement with the fastening element, or is free. This has the advantage that stresses or forces during operation of the exhaust gas turbocharger act on the bore only in the region of the fit, in this case being the press fit, but not in the region in which the bore is out of engagement with the fastening element so that the bore is essentially not deformed there.

The invention is explained in more detail in the following based on the exemplary embodiments which are represented in the schematic figures of the drawings. In the drawing:

DESCRIPTION OF THE INVENTION

In all the figures, the same or functionally the same elements and devices—unless specified otherwise—have been provided with the same designations.

Figure 1:
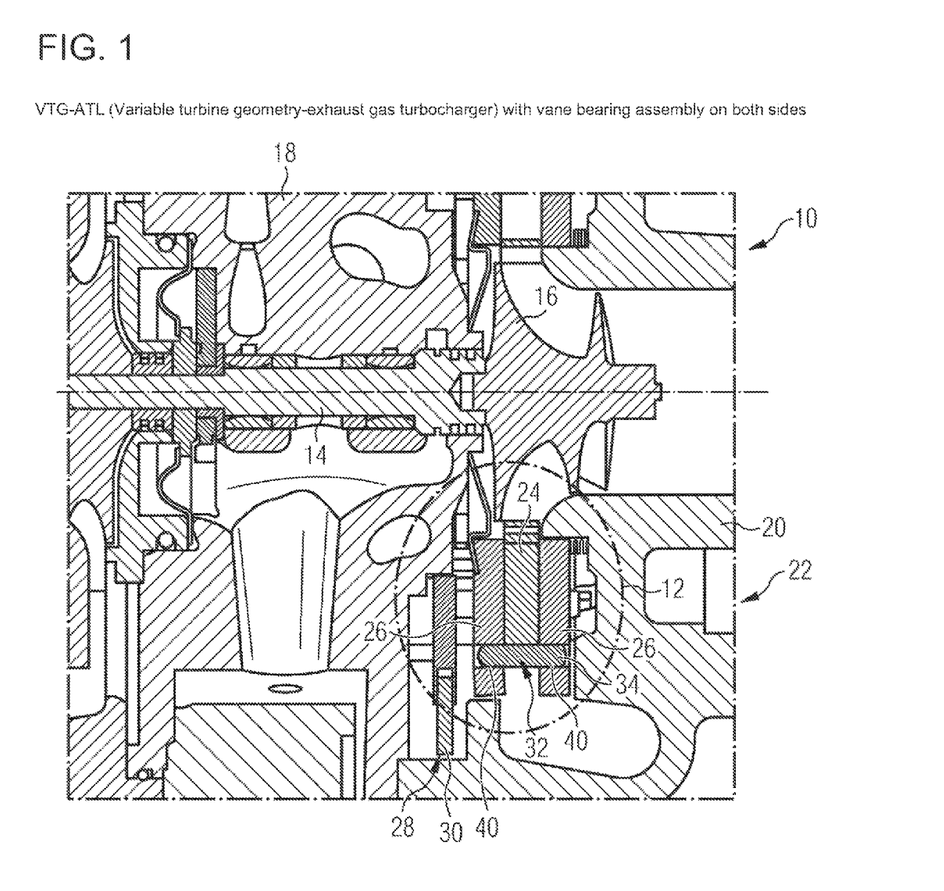
FIG. 1 shows a sectional view of a turbocharger with a variable turbine geometry VTG in which the vane bearing rings are fastened with fastening elements according to a first embodiment of the invention.

In FIG. 1, a partial sectional view of a turbocharger 10 with a variable turbine geometry (VTG) 12 is first shown. Arranged on the shaft 14 of the turbocharger 10 in this case are a turbine wheel 16 and an impeller (not shown). The shaft 14 itself is supported in a bearing housing 18 which is connected on one side to a turbine housing 20 in which the turbine wheel 16 is arranged. For adjusting or varying the flow cross section of the turbine 22, provision is made for a variable turbine geometry device (VTG) 12 which has movable or rotatable guide vanes 24.

The variable turbine geometry device 12, as is shown in FIG. 1, has a first and second vane bearing ring element 26, for example, between which are arranged the movable or rotatable guide vanes 24. Furthermore, provision is made for an adjusting device 28 which has an adjusting ring 30, for example. For adjusting the guide vanes 24, provision can be made for a lever element device, for example, which for each guide vane 24 has a lever element, for example, which is connected to the adjusting device 28 or, in this case, to its adjusting ring element 30. By rotating the adjusting ring element 30, the lever element device which is connected to it can be moved and the guide vanes 24 can be moved or rotated accordingly in order to suitably adjust the flow cross section of the turbine 22.

As is shown in FIG. 1, according to the invention the two vane bearing ring elements 26 in this case are positioned in relation to each other by at least one, two, three or more fastening elements 32. The respective fastening element 32 in this case is a pin element 34, for example, being a cylindrical pin element, for example. The fastening elements 32, in this case being the pin elements 34, are provided in this case, for example, either with at least one, two, three, four or more axial notches 36 and form cylindrical notched pin elements in the process, as is subsequently explained in more detail with reference to FIGS. 5 and 6. Alternatively, the respective fastening element 32, in this case being a pin element 34, can also be provided with a knurl 38, being a helix knurl or longitudinal knurl, for example, as is subsequently described in more detail with reference to FIGS. 3 and 4.

The fit between the fastening element 32, or in this case the pin element 34, and the respective bore 40 in the vane bearing ring elements 26 is carried out as follows, for example. In the region, or regions, of the knurl or of the notch of the pin element 34, this together with the bore 40 of the vane bearing ring element 26 forms a press fit, and in the region, or regions, of the pin element 34 without a knurl or notch, the pin element together with an associated bore, being the bore 40 of the vane bearing ring element 26, for example, forms a clearance fit or a transition fit, for example.

Figure 7:
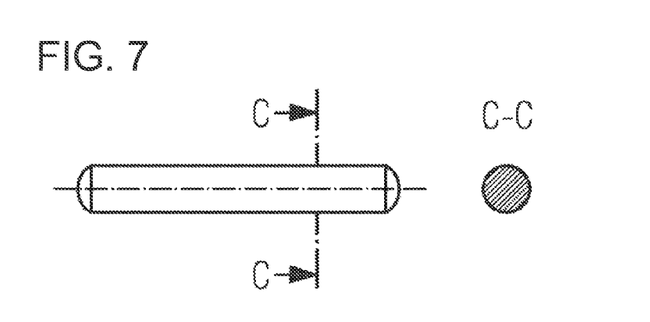
FIG. 7 shows a view of a pin element according to the prior art and a cross-sectional view C-C of this pin element.

In the case of a fastening element 24 in the form of a cylindrical notched pin element, for example, the exact positioning of the vane bearing ring elements 26 in relation to each other is carried out in this case via the outside notch diameter. In the case of a fastening element 24 in the form of a pin element 34 with a knurl, with a longitudinal knurl 38, for example, the positioning of the vane bearing ring elements 26 in relation to each other is carried out via the outside knurl diameter (d2 in FIG. 3). The points of the notch mouths or of the knurl mesh in this case in the corresponding bores 40, for example, of the vane bearing ring elements 26. This has the advantage compared with simple (smooth-walled) cylindrical pins, as is shown in FIG. 7, that a smaller pressing-in force is required in the case of the fastening elements 32 according to the invention since the fastening elements 32 do not form a press fit with the vane bearing ring element 26 over the entire length of the bore 40 of the respective vane bearing ring element 26. In other words, only one section of the bore forms a press fit with the fastening element 32. This smaller pressing-in force has the result that a smaller build-up of the material around the respective bore 40 can be achieved, wherein, however, an exact positioning of the vane bearing ring elements 26 in relation to each other can be ensured. Furthermore, the installation of the fastening elements 32 according to the invention is considerably simpler in comparison with the normal cylindrical pins with a press fit over the entire length of the bore, as is shown in FIG. 7, for example. A further advantage of the fastening elements 32 according to the invention is the significantly improved positioning accuracy in comparison with the normal smooth, or smooth-walled, cylindrical pins, as shown in FIG. 7, with a clearance fit.

A further advantage of the fastening elements 32 according to the invention, in this case of an essentially cylindrical pin element 34 with one or more notches 36 or of a cylindrical pin element 34 with a longitudinal knurl 38, for example, is the adjustment and fixing of the axial distance between the two vane bearing ring elements 26 or the adjustment of the passage height, for example.

The points of the notch mouths or of the knurls 38 in this case plastically deform the bore 40 in the respective vane bearing ring 26, i.e. the mating contour which is formed by the bore 40. However, the fastening elements 32, or pins, according to the invention do not deform the bore 40 or the mating contour over its entire length, for example. If the installation force is greater than the forces which act during operation, for example the forces narrowing the vane passage, no further pressing-in of the pin 32 takes place during operation. This means the passage height and the axial vane clearance are maintained. Therefore, such a system can also be used for the one-sided bearing assembly since the distance sleeve, or sleeves, can then be dispensed with, for example.

Figure 2:
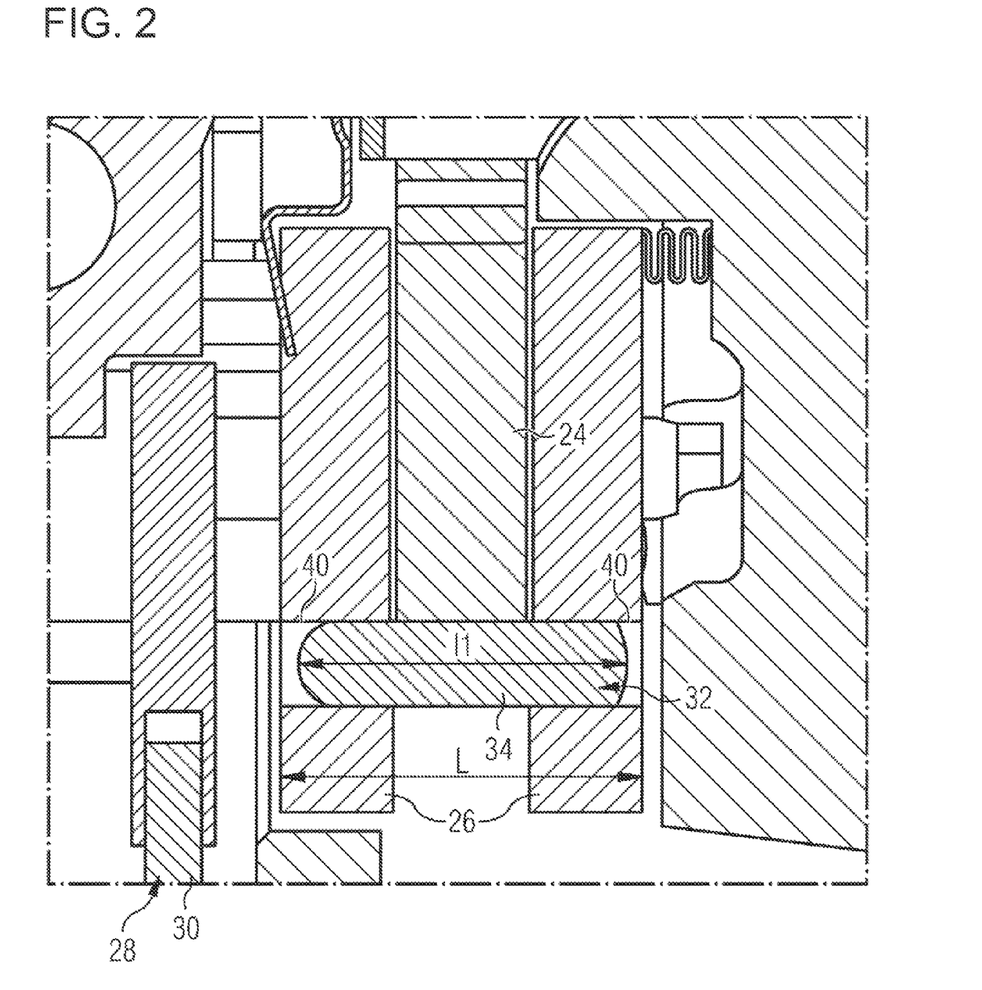
FIG. 2 shows an enlarged detail of the fastening of the variable turbine geometry VTG according to FIG. 1.

In FIG. 2, an enlarged detail of the fastening of the variable turbine geometry device 12 according to FIG. 1 is shown. The cylindrical pin 32 according to the invention, as is shown in FIG. 2 in a greatly simplified and schematic arrangement, according to the invention can be provided with one or more notches 36 (not shown) or with at least one, two or more sections with a longitudinal knurl 38 (not shown). The fastening element 32 according to the invention in this case connects the two vane bearing ring elements 26, whereas the respective guide vane 24 which is arranged in between is rotatably arranged around the fastening element 32 in order to be suitably pivoted by means of the adjusting device for adjusting a prespecified flow cross section of the turbine. Other than two vane bearing ring elements 26, only one vane bearing ring element (not shown) may also be provided and fastened by means of one or more fastening elements 32 according to the invention.

The cylindrical pin element 32, or the fastening element 34 according to the invention, has a length l, for example, which is shorter or less than the overall length L of the two vane bearing ring elements 26 and of the guide vane 24 which is arranged in between in each case. If the fastening element 32 is now provided with a knurl or one or more notches over its entire length l1, then together with the two bores 40 of the vane bearing ring elements 26 it forms a press fit in each case. Since the fastening element 32 is shorter, however, than the overall length L, a section, for example, of the respective bores 40 remains free, in which section the bore is not paired with the fastening element 32. This has the advantage that during operation stress forces occur essentially only in the region of the pairing of fastening element 32 and bore 40 but not in the region where the bore 40 is not paired or forms only a clearance fit, for example, with the fastening element 32, as is explained in more detail in the following with reference to FIGS. 3 and 4. This means that the fastening element 32 is reliably retained even during operation. In contrast to this, the problem occurs in the prior art that a smooth-walled, cylindrical pin element, as is shown in FIG. 7, which together with the bore of a vane bearing ring element forms a press fit over the entire length of the bore, for example, can become loose during operation as a result of the stress forces which can occur and which can widen the bore.

Instead of a fastening element 32 which is shorter than the overall length L of the vane bearing ring elements 26 and of the guide vanes 24 which are arranged in between, a fastening element 32 which has a length l1 which is the same as or greater than the overall L can also be used. In this case, the fastening element 32 is designed in such a way as is shown in the following FIG. 3, for example.

Figure 3:
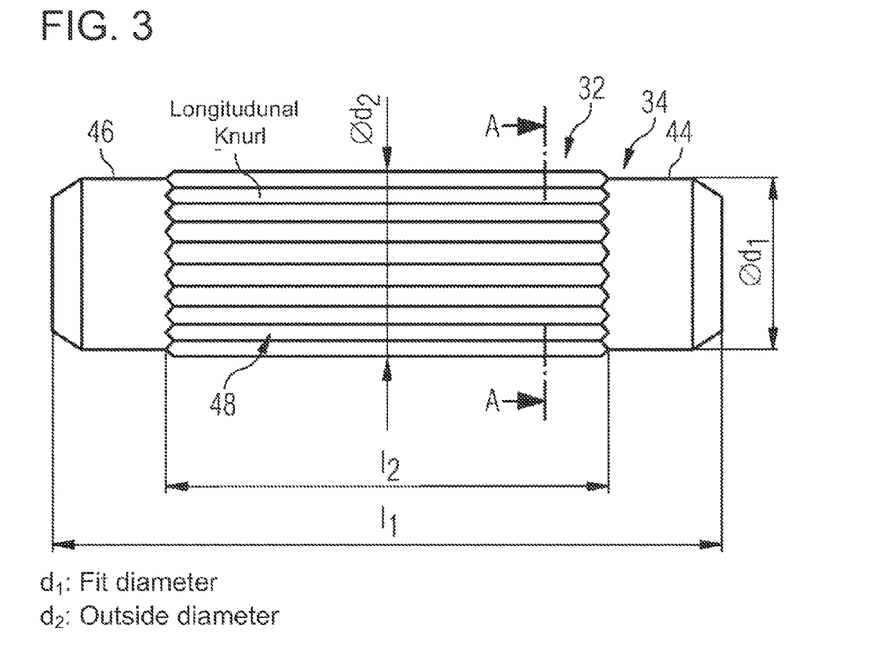
FIG. 3 shows a view of a fastening element for fastening vane bearing rings of a variable turbine geometry according to the first embodiment of the invention.

Shown in FIG. 3 is a view of a first embodiment of a fastening element 32 according to the invention for fastening vane bearing ring elements 26, for example, of a variable turbine geometry device 12 as in FIGS. 1 and 2. The fastening element 32 in this case is designed in the form of a cylindrical pin element 34, wherein the cylindrical pin element 34 has a section 42 with a knurl, in this case being a longitudinal knurl 38. Furthermore, the front and rear ends 44, 46 of the cylindrical pin element 34 are of smooth-walled or straight-walled design. The cylindrical pin element 34 has an overall length l1, wherein the section 42 with the longitudinal knurl 38 has a length l2, wherein l1>l2, for example. Furthermore, the section 42 with the longitudinal knurl 38 has a knurl outside diameter d1 which forms the fitting diameter of the fastening element 32. Furthermore, the smooth-walled ends 44, 46 of the cylindrical pin element 34 have an outside diameter of d1 in each case, wherein d2>d1, for example, applies. The diameters of the two ends 44, 46 can be the same or different in size. The overall length l1 can now be smaller, the same as, or greater, for example, than the overall length L of the respective bores 40 of the vane bearing ring elements 26 and of the guide vanes 24 which are arranged in between in each case. It is vital in this case that the length l2 of the section with the knurl 38 is selected so that the fastening element 32 forms a press fit only in one region of the bores 40 in the installed state, whereas the free ends 44, 46 in each case, for example, with the smaller diameter d1 form a clearance fit, for example, with the bore 40. This has the advantage that stress forces which occur during operation, for example, which deform or widen the respective bore 40 only in the region of the press fit, cannot do so, however, in the region of the clearance pairing between fastening element 32 and bore 40, for example.

Figure 4:
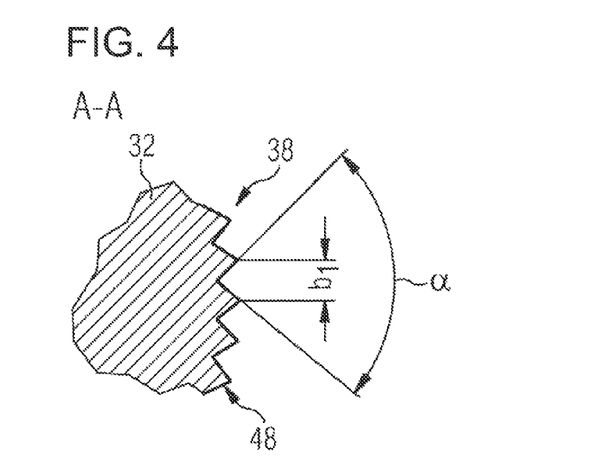
FIG. 4 shows a detail of a sectional view A-A of the fastening element according to FIG. 3.

In FIG. 4, a detail of a sectional view A-A of the section of the fastening element 32 with the longitudinal knurl 38 according to FIG. 3 is shown. The longitudinal knurl 38 in this case has axially parallel serrations 48, for example, with a pitch b1 and a profile angle α. The profile angle α in most cases is α=90°, for example, or in special cases even α=105°. The invention, however, is not limited to these sizes of profile angles α, these are only by way of example and not limiting. In addition to a longitudinal knurl 38, any other type of knurling can also be provided.

Figure 5:
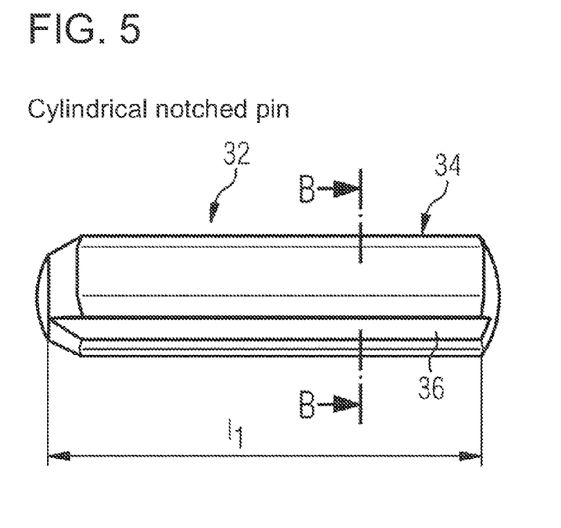
FIG. 5 shows a view of a fastening element for fastening vane bearing rings of a variable turbine geometry according to a second embodiment of the invention.

Furthermore, in FIG. 5 a view of a fastening element 32 for fastening vane bearing ring elements of a variable turbine geometry device according to a second embodiment of the invention is shown. The fastening element 32 in the form of a pin element 34, or in this case a cylindrical pin element, has one, two, three or more notches 36 on its periphery in the longitudinal direction. The respective notch 36 in this case extends over the entire length of the fastening element 32, for example, or only over a part of the length of the fastening element (not shown) or over a section of the fastening element. If the notch, or notches 26, extends, or extend, over the entire length of the pin element or fastening element 32, then for fastening the two vane bearing ring elements 26, as are shown in FIGS. 1 and 2, a fastening element 32 is selected with a length l1 which is shorter than the overall length L of the bores 40 of the two vane bearing ring elements 26 and of the guide vanes 24 which are arranged in between. Alternatively, the notched pin element can just have at least one section with one or more notches (not shown), corresponding to the fastening element 32 in FIG. 3.

Figure 6:
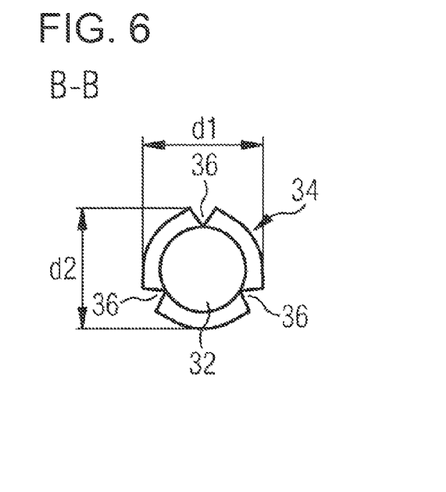
FIG. 6 shows a cross-sectional view B-B of the fastening element according to FIG. 5.

In FIG. 6, the cross section of the fastening element 32 according to FIG. 5 is shown. Notches 36 are introduced into the periphery of the fastening element 32, in this case of the cylindrical pin element 34, for example. In this case, three notches 36 which are offset by 120°, for example, in the longitudinal direction are rolled or pressed, for example, into the cylindrical shank, the beads of which notches, upon entry, press against the wall of a bore, as a result of which a shakeproof seat is achieved.

These notches 36 can have different shapes depending upon intended application and form tapered notched pins, center-grooved notched pins, conical notched pins or close tolerance notched pins, for example. As a result of the notches 36, the notched pin 32, even in very smooth bores 40, maintains a shakeproof retention, as previously described, which continues to hold good even during disassembly.

In FIG. 7, a cylindrical pin is finally shown, as is used previously during installation of a variable turbine geometry device. The cylindrical pin in this case has a smooth cylindrical shank without knurls, notches and the like.

Although the present invention was previously described with reference to preferred exemplary embodiments, it is not limited thereto, but can be modified in multifarious ways. The previously described embodiments, especially individual features thereof, can be combined with each other in this case.

In particular, the invention is not limited to the described examples of a fastening element 32 in the form of a notched pin 36 or of a pin with a longitudinal knurl 38. Furthermore, the invention is not limited to the specific variable turbine geometry device and its fastening and components, as shown in FIGS. 1 and 2. This variable turbine geometry and its components and the fastening, as well as the design of the entire turbocharger, are only by way of example. The fastening elements according to the invention can basically be applied to all types of variable turbine geometry devices and turbochargers in order to fasten components, such as vane bearing ring elements or other parts of the variable turbine geometry device.

Furthermore, the vane bearing ring elements, or vane bearing element, can be selectively additionally fastened via one or more screw elements etc., and/or via a spring element. This applies for all the embodiments of the invention.

The invention claimed is:

1. A turbocharger, comprising:
a variable turbine geometry device with one or two vane bearing ring elements;
at least one or more fastening elements for fastening said one or two vane bearing ring elements, said at least one fastening element having at least one section formed with a knurl and/or at least one section formed with at least one or more notches;
wherein said vane bearing ring element is formed with bore for receiving said fastening element, and wherein a section of said bore of the respective said vane bearing ring element together with said region of said fastening element formed with said knurl or said one or more notches forms a press fit, and wherein said bore together with a region of said fastening element that is not formed with said knurl or with said notches forms a clearance fit.

2. The turbocharger according to claim 1, wherein said at least one of more fastening elements is a plurality of fastening elements each having said at least one section formed with said knurl and/or at least one section formed with said one or more notches.

3. The turbocharger according to claim 1, wherein said at least one fastening element is a pin element.

4. The turbocharger according to claim 3, wherein said at least one fastening element is a cylindrical pin.

5. The turbocharger according to claim 4, wherein two vane bearing ring elements are positioned in relation to each other via at least one or more fastening element(s) in each case.

6. The turbocharger according to claim 1, wherein said at least one fastening element is formed with said knurl over an entire length thereof or over at least one or more sections.

7. The turbocharger according to claim 6, wherein said knurl is a longitudinal knurl or a helical knurl.

8. The turbocharger according to claim 1, wherein said at least one fastening element is a pin element formed with at least one, two, three, or more notches over an entire length thereof or over at least one or more sections.

9. The turbocharger according to claim 8, wherein said pin element is a notched pin having a plurality of notches formed therein.

10. The turbocharger according to claim 9, wherein said notched pin is a pin element selected form the group consisting of a tapered notched pin, a center-grooved notched pin, a conical notched pin, and a close tolerance notched pin.

11. The turbocharger according to claim 8, wherein said vane bearing ring element is formed with bore for receiving said fastening element, and wherein a fit between said fastening element and an associated said bore in said vane bearing ring element, in a region of said knurl or of said notch, is a press fit.

12. The turbocharger according to claim 1, wherein a center section or two end sections of said fastening element is formed with said knurl or with said one or more notches.

13. The turbocharger according to claim 12, wherein said center section or said two end sections of said fastening element are formed with a longitudinal knurl or a helical knurl.

14. The turbocharger according to claim 1, wherein said fastening element is formed with a knurl or one or more notches along an entire overall length, and said overall length of said fastening element is less than an overall length of said vane bearing ring elements and of guide vanes disposed in between in each case.

\* \* \* \* \*